Dec. 7, 1954  H. PERMAN ET AL  2,696,051
FOOT MEASURING INSTRUMENT
Filed Jan. 26, 1951  8 Sheets-Sheet 1

Inventors
Hakan Perman
Uno Bernhard Rylander
By Robert E. Burns
Attorney

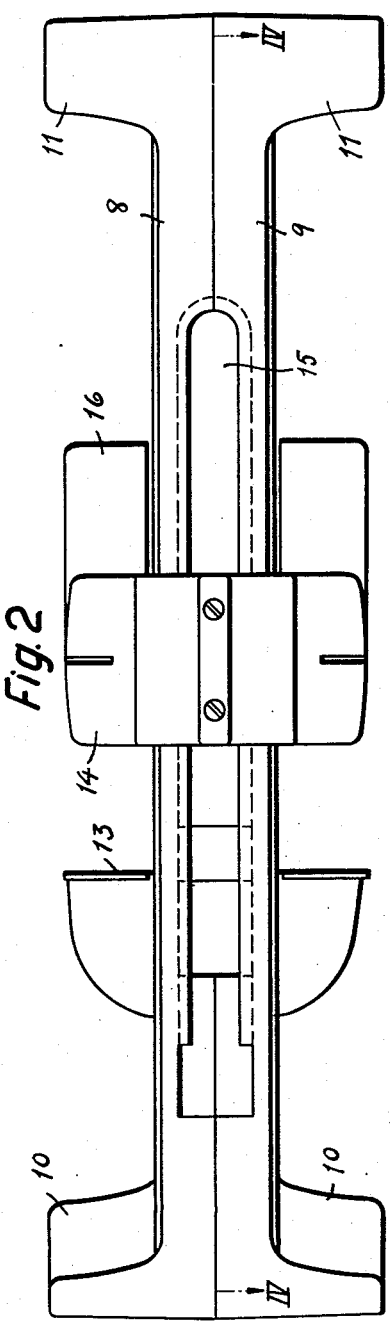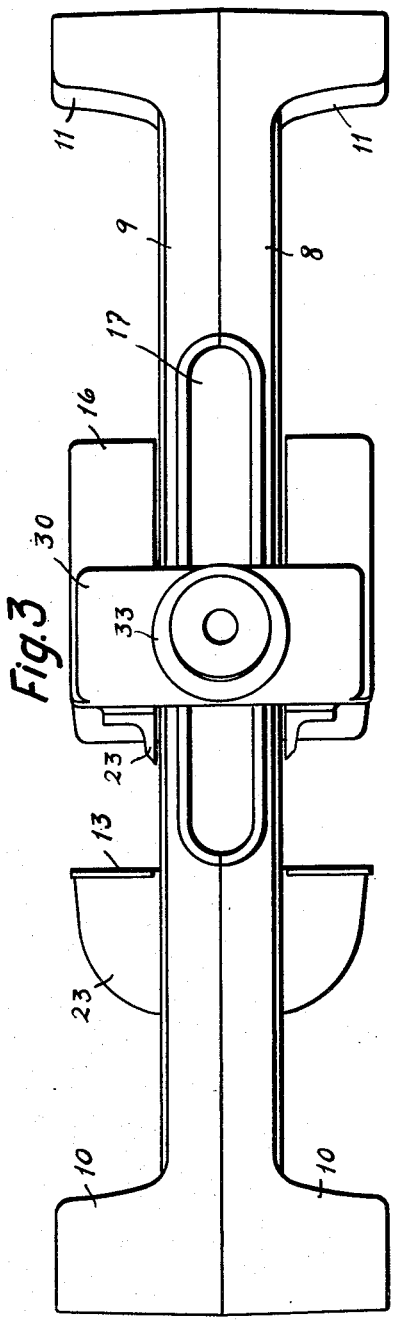

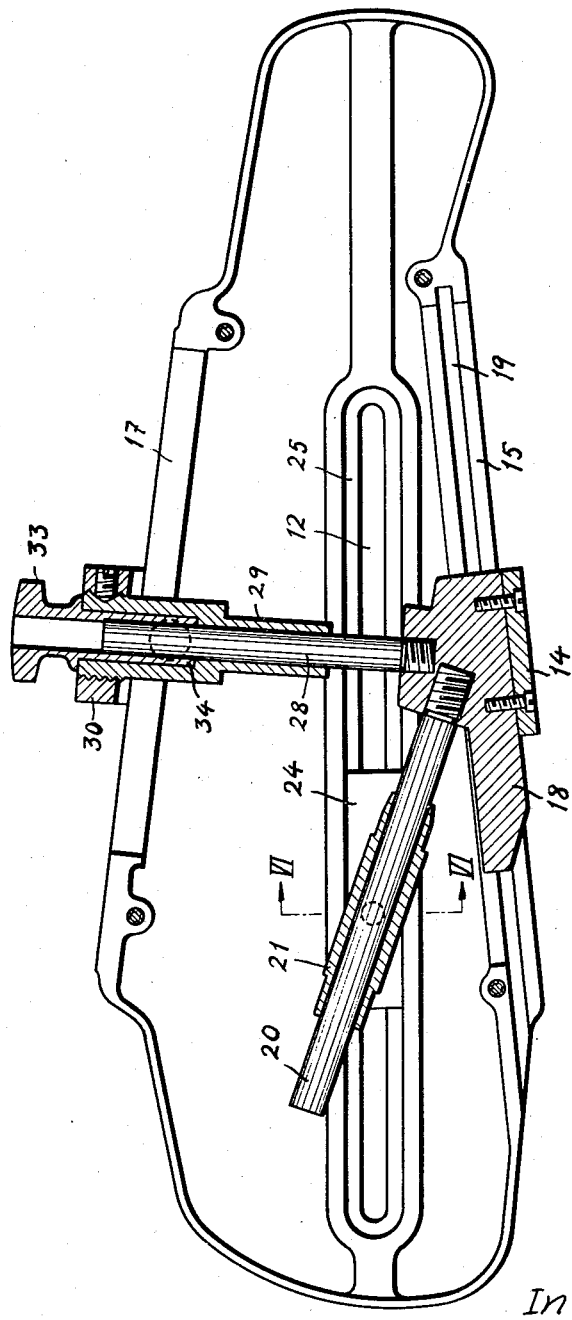

Dec. 7, 1954  H. PERMAN ET AL  2,696,051
FOOT MEASURING INSTRUMENT
Filed Jan. 26, 1951  8 Sheets-Sheet 4
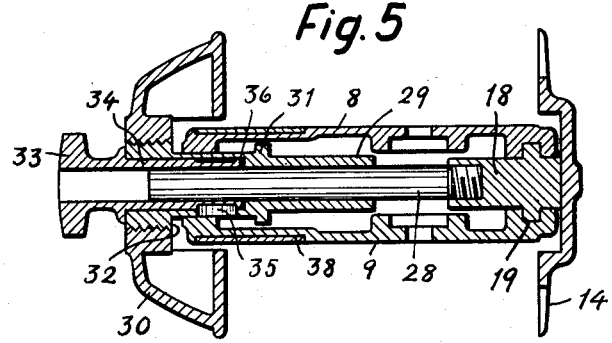
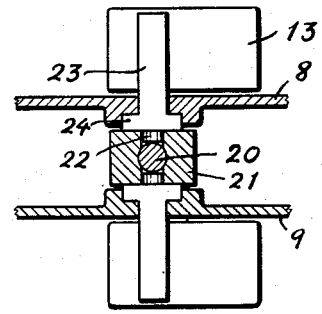
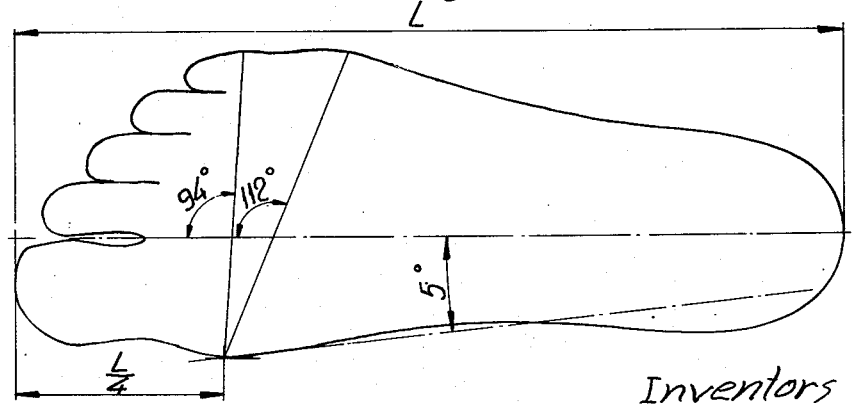
Inventors
Hakan Perman
Uno Bernhard Rylander
By Robert E. Burns
Attorney

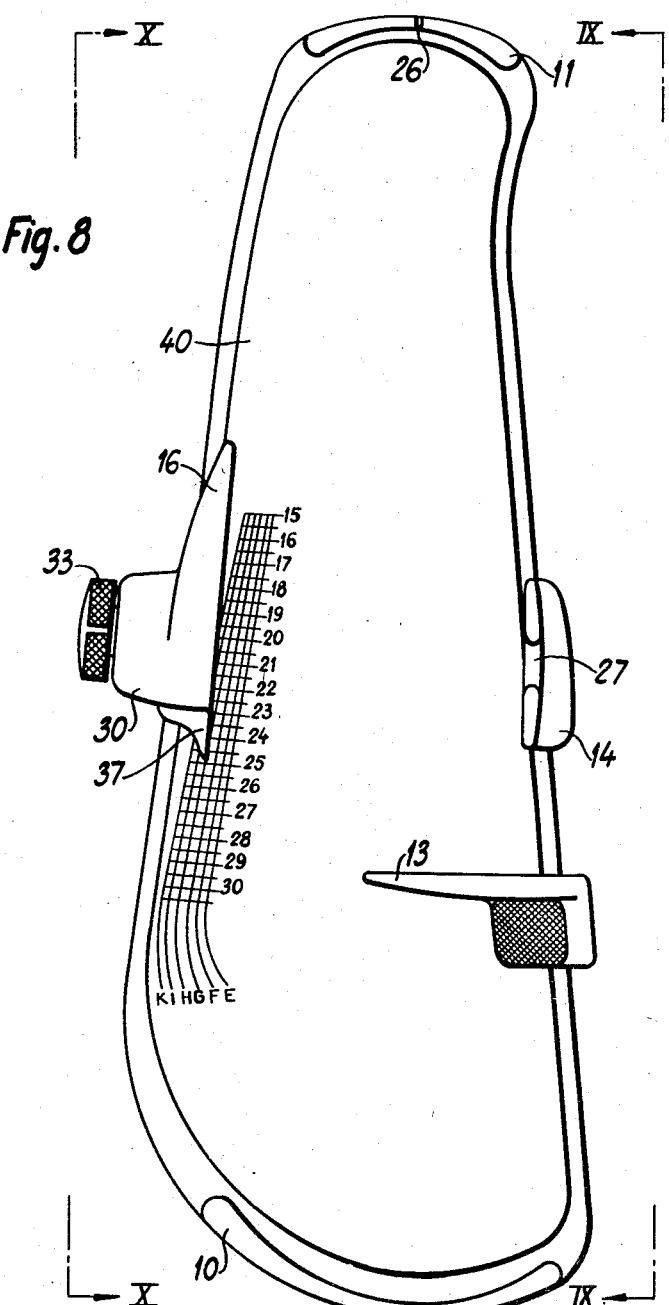

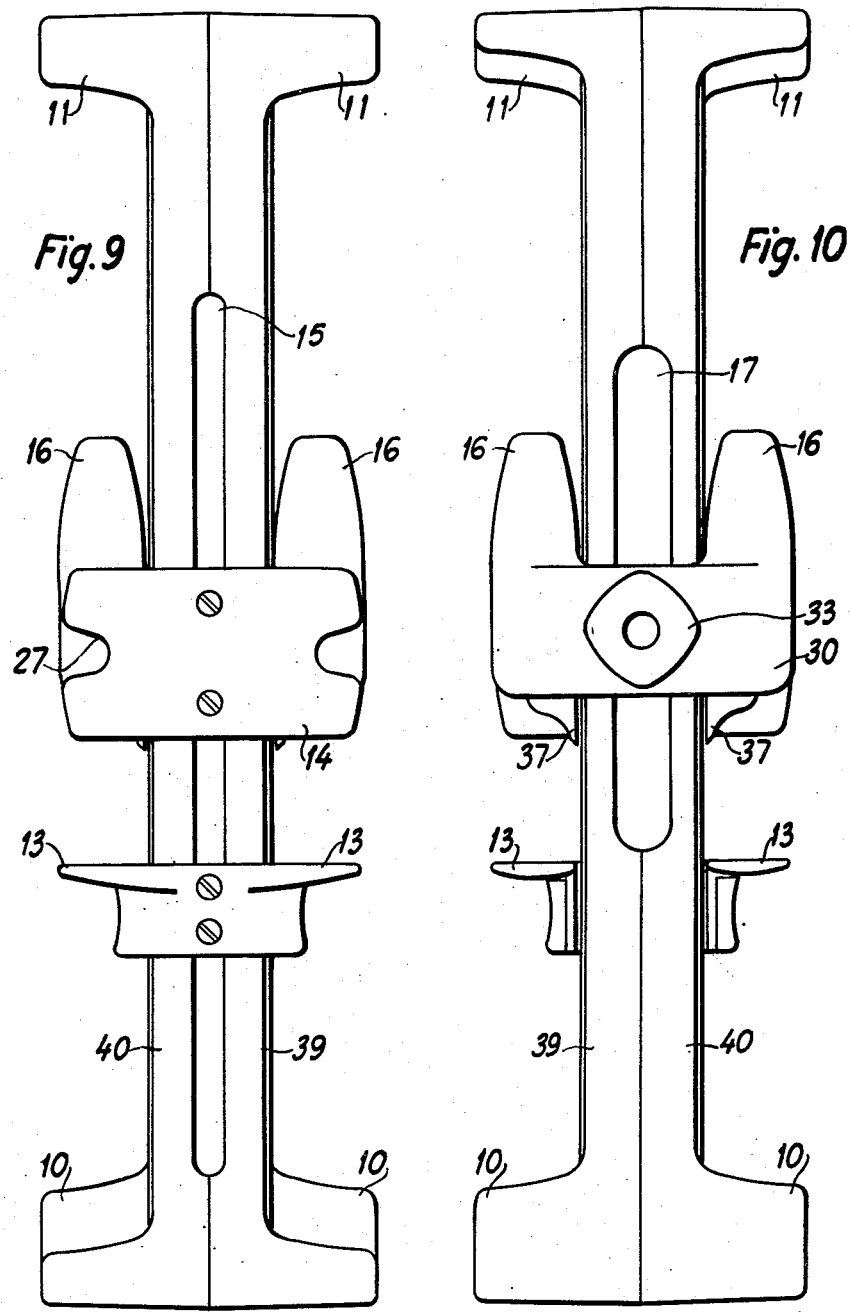

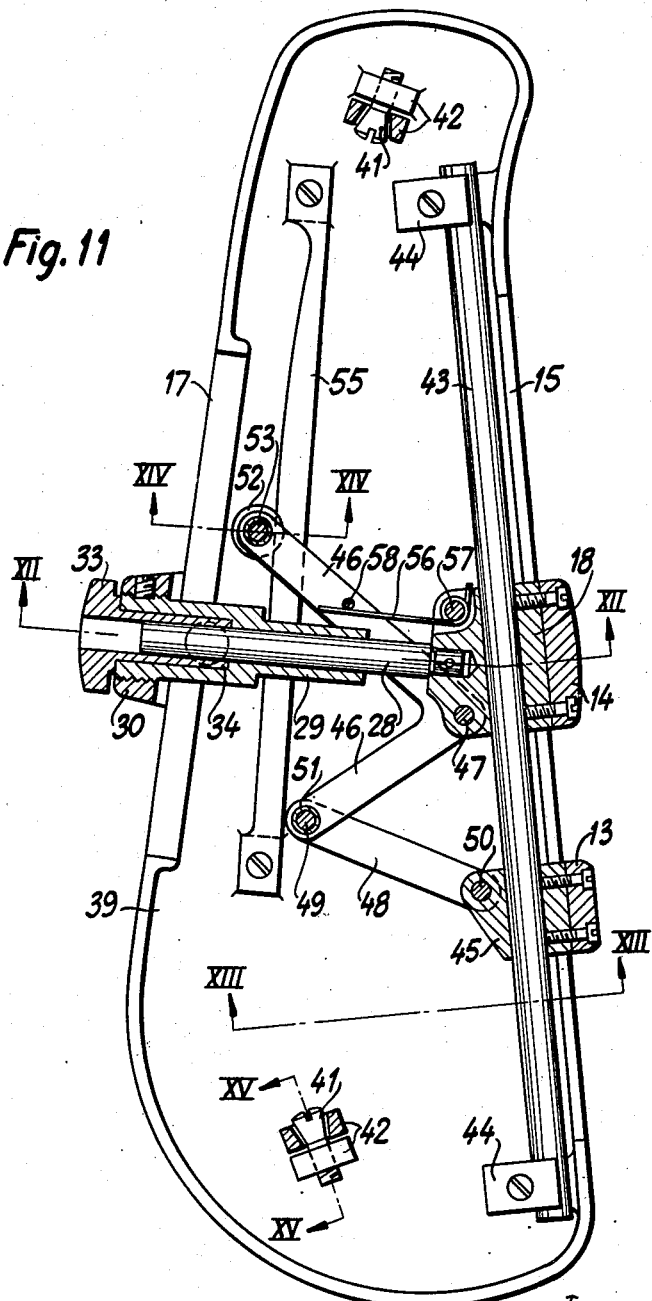

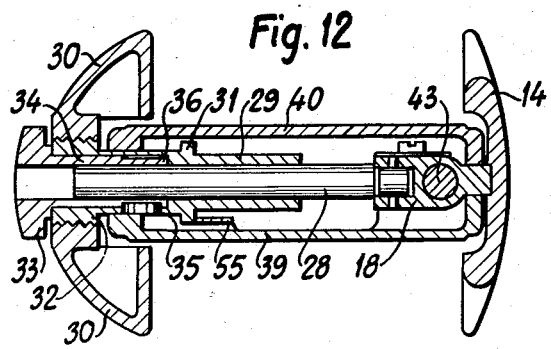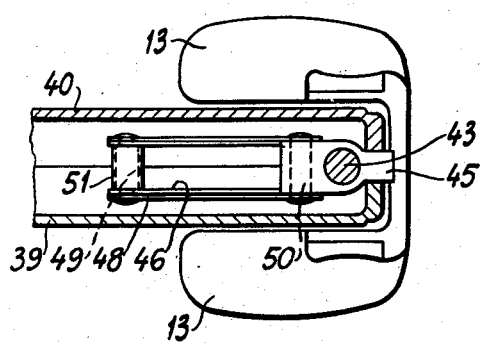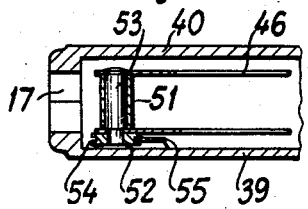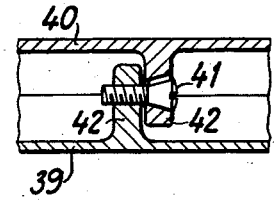

United States Patent Office 2,696,051
Patented Dec. 7, 1954

2,696,051

FOOT MEASURING INSTRUMENT

Håkan Perman, Örebro, and Uno Bernhard Rylander, Stockholm, Sweden, assignors to Svenska Skofabrikantforeningen, Stockholm, Sweden, an association of Sweden Application January 26, 1951, Serial No. 207,878

Claims priority, application Sweden February 1, 1950

7 Claims. (Cl. 33—3)

By numerous and systematic foot measurements according to a new system it has been found that practically without exception normal feet, even if otherwise unlike, have certain common and essential characteristics. Among other it has been found (see Fig. 7 in the annexed drawings) that the perpendicular distance from the tangent through the tip of the great toe (hallux) and the outermost point of the so called inner ball is in almost exact proportion to the length of the foot. For the testing material, Swedish men, the proportion was 1:4, but other values may possibly be valid for other races. Furthermore, the straight line through the extreme points of the inner and outer ball forms an angle of about 112° to the so called central line (a straight line from the central point of the heel to the space between the great toe and the adjacent toe), and a straight line from the extreme point of the inner ball to the extreme point of the little toe forms an angle of about 94° to the central line. For feet of different sizes the extreme points of the inner balls are generally situated along a line forming an angle of 5° to the central line and crossing the same at a point behind the heel. The width of the feet, measured along the line between the inner and the outer ball, varies, but a more or less constant condition is prevailing between this width and the circumference of the foot at this place.

The above mentioned experiments and results constitute the base for the present invention which refers to a simple and efficient foot measuring instrument, intended to be used at the sale of shoes in order to make possible the selection of the most suitable fit. The instrument comprises in combination a first rule, adapted to contact the point of the great toe and movable along a straight line from the central point of the heel to the space between the great toe and adjacent toe (central line), a second rule, adapted to contact the inner ball and movable along a line crossing the central line at a point behind the heel at an angle determined in dependence of the race and for instance amounting to 5°, said two rules being arranged to be moved in dependence of each other such that a certain predetermined relation is prevailing between the length of the foot and the perpendicular distance between the first rule and the contact point of the second rule at the foot, a third rule, adapted to contact the extreme point of the outer side of the foot and joined to the second rule to be moved together with it in the longitudinal direction of the foot, said third rule also being movable separately in the transversal direction to measure the width of the foot, and besides being connected to a pointer pointing on a scale indicating the length as well as the width of the foot.

Further characteristics according to the invention will appear from the following description with reference to the accompanying drawings showing two different embodiments of the instrument.

In the drawings:

Figs. 2 and 3 show side elevations of the same instrument seen from the left and the right respectively in Fig. 1, as indicated by lines II—II and III—III, respectively.

Fig. 4 is a horizontal section along the line IV—IV in Fig. 2.

Fig. 5 is a vertical section along the line V—V in Fig. 1.

Fig. 6 is a vertical section along the line VI—VI in Fig. 4.

Figure 1:
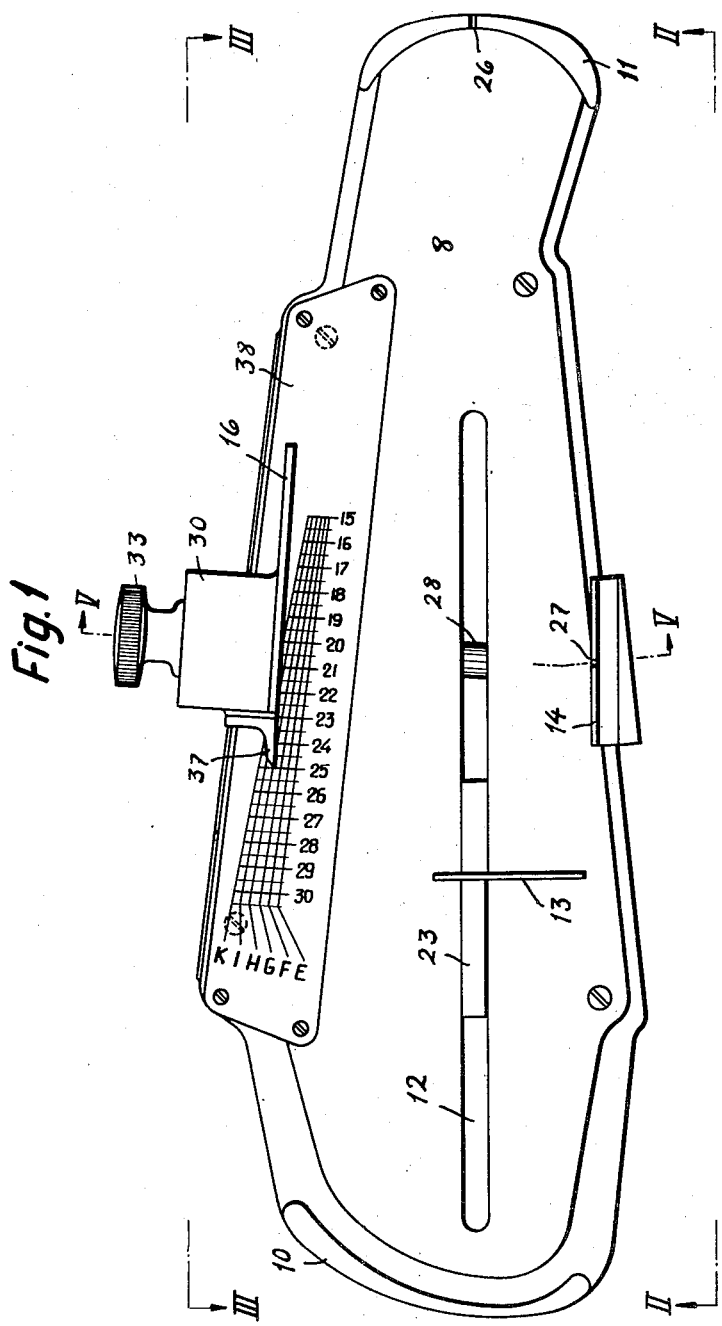
Fig. 1 is a plan view of an embodiment of the instrument (upper side and under side are each other's images).

Fig. 7 demonstrates the results of the examination of the foot above described.

Figs. 8 to 11 are views similar to those in Figs. 1 to 4 respectively but showing another embodiment of the instrument.

Fig. 12 shows a vertical section along the line XII—XII in Fig. 11.

Fig. 13 shows a vertical section along the line XIII—XIII in Fig. 11.

Fig. 14 shows a vertical section along the line XIV—XIV in Fig. 11, and

Fig. 15 shows a vertical section along the line XV—XV in Fig. 11.

As will be seen from Figs. 2 and 3 the first embodiment consists of a block formed by two longitudinal plates 8, 9 fixed to each other by screws. Said plates support the measuring members and in a cavity formed between them is enclosed the mechanism required for displacement of said members in dependence upon each other. The two outer sides of the plates are intended to form supports in measuring right foot and left foot respectively and for that purpose they are provided with exactly the same equipment and arranged as images of each other. Projecting flanges 10, 11 are provided at the ends of each plate, these flanges serving to support the plate turned downwards, and besides the flange 11 on the plate turned upwards serves as a support for the heel of the foot to be measured.

In the following a number of details will be described only with regard to one side of the apparatus, it being understood that the same features also are applicable to the other side.

As shown in Fig. 1 the plate 8 is provided with a longitudinal slot 12 arranged substantially along the central line of a foot placed on the plate for measurement. Along this slot 12 a transversal rule 13 is slidable to be adjusted to contact the tip of the great toe. Another rule 14 intended to be adjusted to contact the inner ball is slidable along a slot 15 (see Fig. 2) arranged between the two plates along one of the vertical longsides of the block formed. The slotted portion of said side forms in the horizontal plane an angle of 5° to the slot 12. A third rule 16, intended to be adjusted to contact the outer ball, is arranged to be moved along a slot 17 in the opposite vertical longside of the block. The latter side also forms a certain minor angle to the slot 12.

From Figs. 4–6 it will appear how the measure rules mentioned above are mounted in relation to each other. A slide 18, at the outer end of which the rule 14 is fixed, is slidable in the slot 15 and in addition it is guided in slots 19 which are parallel to but at right angles to slot 15 and are provided on the inner sides of the plates. One end of a rod 20 projecting diagonally is fixed to the slide 18 (Fig. 4) and supports in turn a slide 21 slidable on it (see also Fig. 6). Another slide 23 is by means of a pivot 22 fixed to the slide 21 and projects through the slot 12 in which it is slidably guided. For further guidance an enlarged portion 24 of the slide 23 is inserted in a slot 25 provided in the lower side of the plate 8 in parallel to the slot 12. Said slide 23 carries the rule 13 adapted to contact the great toe. The operation of the device described is such that if, for instance, the slide 23 is moved in either direction in the slot 12 the slide 18 is withdrawn in the slot 15 by reason of the fact that the slide 21 is forced to move along the rod 20. For instance, if the slide 23 is moved forwards from the heel the slide 21 will move outwardly towards the free end of the rod 20. Thus, the rule 13 will move at a faster speed than the rule 14 and in such a way that the distance between it and a point 26 on the heel support (the starting point of the central line) is always in a constant relation to the distance between said point 26 and a mark 27 (groove or the like) on the rule 14, which mark indicates the point where this rule will contact the inner ball. The angle between the slot 15 and the rod 20 has been chosen such that both said distances are always in proportion 4 to 3.

Another rod 28 is by one of its ends also fixed to the slide 18 and is directed in an angle of 94° to the slot 12 (central line). Said rod traverses the block and projects through the slot 17 on the opposite side. At its outer end the rod 28 carries elements supporting the rule 16 adapted to be adjusted to contact the outer ball or the ball of the little toe. Thus, this latter rule will be moved in the longitudinal direction of the instrument at the same speed as the rule 14 so that it will always be directed to the outer ball. Furthermore, the rule 16 is movable in the longitudinal direction of the rod 28 to make possible the measurement of the width of the foot. The constructional details appear in Fig. 5.

A sleeve 29 is slidably mounted on the rod 28 and is also slidable along the slot 15. A member 30 projecting towards both horizontal sides of the block and carrying a rule 16 on each projection is fixed to the outer end of the sleeve 29. The portion of the sleeve 29 traversing the slot 17 has a cylindrical envelope surface of a greater diameter than the width of the slot, but the cylindrical surface is broken by two diametrically opposite chamferings at a distance from each other exactly fitted to the width of the slot 17 so as to form sliding surfaces for the sleeve in the slot. In this way the sleeve may slide freely but is prevented from being turned in the slot 17.

Both chamfered surfaces are inwardly limited by two segment-shaped shoulders 31 which stop against the inner edges of the slot 17 when the sleeve is moved outwardly. In a similar way two corresponding shoulders 32 on an outer threaded portion of the sleeve are stopped against the outer edges of the slot 17.

An operating wheel 33 for adjusting the rule 16 and locking it in adjusted position is fixed to or elongated to form a tubular sleeve 34 which is pivotally journaled around the outer end of the rod 28 within a boring 1 provided in the outer thicker part of the sleeve 29. The outer surface of the sleeve 34 is eccentrically reduced on a portion located somewhat inside its end remote from the wheel 33 and opposite to this reduced portion the sleeve 29 has a radially directed hole opening to the adjacent inner surface of the slot 17. A bolt 35 is placed in this hole and projects somewhat upwards against the reduced portion of the sleeve 34. When the wheel is turned in either direction the eccentric portion of the sleeve 34 will press down the bolt 35 against the lower edge of the slot 17 to lock all movable parts in their adjusted position.

It should be observed that the sleeve 34 with the wheel 33 is kept in place in the sleeve 29 in that the eccentric groove in the sleeve 34 is limited inwardly by a rim 36 resting against the bolt 35.

Returning now to Fig. 1 the member 30 carrying the rule 16 and being slidable in transversal as well as in longitudinal direction is furthermore provided with a pointer 37 pointing at a scale on a plate 38 fixed to the upper surface of the plate 8. In its longitudinal direction the scale is graded to indicate the length of the foot in a desired unit of measures. Crosswise the scale is graded with the characters E–K which designate different widths of shoes having the same number.

The embodiment shown in Figs. 8–15 corresponds to the embodiment just described as to a plurality of essential details which consequently are given the same reference numerals and do not need to be further explained. In the following only modified details are more closely described.

The two plates 39 and 40 forming the instrument block are fixed to each other by screws 41 (Figs. 11 and 15) inserted in threaded holes in lugs 42 provided on the inner surface of each plate. In this embodiment all movable elements are supported only one one of the plates 39 and 40, whereby the mounting and demounting of the instrument are simplified.

The slide 18 supporting the rule 14 and movable in the slot 15 is guided along a rod 43 fixed at its ends to the inner side of the plate 39 by means of clamps 44. The rod 43 is slidably fitted in a hole in the slide 18. The rod 28 and all members supported by it are constructed exactly as in the first embodiment.

The rule 13 adapted to contact the tip of the great toe is fixed to a sleeve 45 also slidably surrounding the rod 43 and movable in the slot 15. In this way the slot 12 in the first embodiment is unnecessary. The two slides 18 and 45 are coupled to each other by a system of links described hereinafter.

A bell crank 46 is at its tip pivotally fixed to the slide 18 by means of a pivot pin 47. One end of this crank 46 is linked to one end of an arm 48 by a pivot 49. The other end of said arm is linked to the slide 45 by a pivot 50. As seen in Figs. 13 and 14 the crank 46 as well as the arm 48 consists of double elements spaced apart by tubular sleeves 51 surrounding the pivots. This construction is for the purpose of leaving a space sufficient to let the rod 28 pass through it without difficulty.

The other end of the bell crank 46 supports a reel 52 rotatably journaled on a pivot 53. This reel 52 has a peripherical groove 54 to roll along a guide way provided on a member 55 fixed to the inner side of the plate 39. To force the reel to follow said guide way a spring 56 fixed to the slide 18 by a pin 57 acts against a stud 58 on the right portion of the crank 46 in depressing direction.

The guide way on the member 55 has such a curved configuration that the desired relation between the movements of the rules 13 and 14 is maintained within the entire range of measurements. For instance, it may be so that the relation between different measures will be changed somewhat in the case of small feet (children's feet). In such a case it is only necessary to give the rear portion of the guide way a certain curvature.

The embodiment now described is also and preferably applicable in the case of changed measure proportions due to different races. The only modification needed is to insert a new guide way for the reel 52.

When measuring a foot by means of an instrument above described the measuring rules are moved by the aid of the slide 23 so that the rule 13 engages the great toe. If the foot has a normal shape the mark 27 on the rule 14 will then be located just opposite the inner ball. This is to be controlled. By the wheel 33 the rule 16 is then pushed inwards so as to touch the outer ball or the ball of the little toe, depending on which one is outermost. Hereafter the required size of shoe is read on the scale. For instance, with the pointer adjusted as shown in Fig. 1 the size of shoe would be 25H.

For a person with unusually short toes the mark 27 on the rule 14 will not be placed opposite the inner ball but must be adjusted to take this position so that the rule 13 will be placed somewhat in front of the great toe. The size of shoe indicated on the scale will be a little too long but in spite of that it is the right size for the foot in question. The case is that when walking the foot will bend substantially along the line between the inner and the outer ball and the shoes, generally made for normal feet, are intended to bend at the corresponding place. When it is a question of a foot with unusually short toes the shoe would be bent at the wrong place if adjusted to the length of the foot. Thus, the walking would be hampered and the shoe subjected to inappropriate breaks. On the other hand, by choosing the size according to the distance between the inner ball and the heel, the most suitable fit will be obtained.

The measuring instrument according to the invention must not be considered to be limited to the embodiments above described but may be modified in many ways within the range of the claims.

What we claim is:

1. A foot measuring instrument for measuring the length and width of the foot, comprising, in combination, a foot-receiving support having a portion for receiving the heel and a portion for receiving the toes of a human foot, a first slidable member mounted in said support and movable in the direction of the length of the foot, a first rule disposed perpendicularly to a central line extending from the central point of the heel to the space between the great toe and the adjacent toe, said first rule being adapted to contact the tip of the great toe and being carried by said first slidable member, a guide member disposed in the direction of a line crossing the central line at a point behind the heel at a predetermined angle, a second slidable member movable along said guide member, a second rule adapted to contact the inner ball of the foot and mounted on said second slidable member and being movable along said guide member, said two slidable members being linked to each other to move the rules in accordance with a predetermined relation between the length of the foot and the perpendicular distance between the first rule and the contact point of the second rule at the foot, a cross bar secured to the second slidable member, a third rule adapted to contact the extreme point of the outer side of the foot, said third rule being slidable along said cross bar, whereby said third rule is movable together with said second rule in the longitudinal direction of the foot but is also movable separately in the transverse direction to measure the width of the foot, a pointer connected to the third rule, and a scale cooperating with said pointer for indicating the length as well as the width of the foot.

2. A foot measuring instrument for measuring the length and width of the foot, comprising, in combination, a foot-receiving support having a portion for receiving the heel and a portion for receiving the toes of a human foot, a first slidable member mounted in said support and movable in the direction of the length of the foot, a first rule disposed perpendicularly to a central line extending from the central point of the heel to the space between the great toe and the adjacent toe, said first rule being adapted to contact the tip of the great toe and being carried by said first slidable member, a guide member disposed in the direction of a line crossing the central line at a point behind the heel at a predetermined angle, a second slidable member movable along said guide member, a second rule adapted to contact the inner ball of the foot and mounted on said second slidable member and being movable along said guide member, said two slidable members being linked to each other by means of a rod having one of its ends fixed to the second slide member and carrying at its other end a slidable sleeve pivotally mounted on the first slide member, the angle between said rod and the central line being such that in each position of said rules a predetermined relation prevails between the length of the foot and the perpendicular distance between the first rule and the contact point of the second rule at the foot, a cross bar secured to the second slidable member, a third rule adapted to contact the extreme point of the outer side of the foot, a sleeve slidable along said cross bar, said third rule being mounted on said sleeve, whereby said third rule is movable together with said second rule in the longitudinal direction of the foot but is also movable separately in the transverse direction to measure the width of the foot, a pointer connected to the third rule, and a scale cooperating with said pointer for indicating the length as well as the width of the foot.

3. A foot measuring instrument as defined in claim 2, wherein the sleeve carrying the third rule is provided with single locking means to secure all movable members in adjusted position.

4. A foot measuring instrument for measuring the length and width of the foot, comprising, in combination, a foot-receiving support having a portion for receiving the heel and a portion for receiving the toes of a human foot, a first slidable member mounted in said support and movable in the direction of the length of the foot, a first rule disposed perpendicularly to a central line extending from the central point of the heel to the space between the great toe and the adjacent toe, said first rule being adapted to contact the tip of the great toe and being carried by said first slidable member, a guide member disposed in the direction of a line crossing the central line at a point behind the heel at a predetermined angle, a second slidable member movable along said guide member, a second rule adapted to contact the inner ball of the foot and mounted on said second slidable member and being movable along said guide member, a lever and link system connecting said slidable members, a curved guide member guiding said lever and link system in such manner that in each position of said rules a predetermined relation prevails between the length of the foot and the perpendicular distance between the first rule and the contact point of the second rule at the foot, a third rule adapted to contact the extreme point of the outer side of the foot and slidably connected to the second rule, whereby said third rule is movable together with said second rule in the longitudinal direction of the foot but is also movable separately in the transverse direction to measure the width of the foot, and a pointer connected to the third rule and a scale cooperating with said pointer for indicating the length as well as the width of the foot.

5. A foot measuring instrument as defined in claim 4, wherein the lever and link system comprises a bell crank pivotally mounted on the second slidable member and a link connecting one of its ends to the first slidable member, a rotatable reel carried on the other end of the crank, and a spring acting on the crank to force it to roll along said curved guide member.

6. A foot measuring instrument for measuring the length and width of the foot, comprising, in combination, a foot-receiving support having a portion for receiving the heel and a portion for receiving the toes of a human foot, a first slidable member mounted in said support and movable in the direction of the length of the foot, a first rule disposed perpendicularly to a central line extending from the central point of the heel to the space between the great toe and the adjacent toe, said first rule being adapted to contact the tip of the great toe and being carried by said first slidable member, a guide member disposed in the direction of a line crossing the central line at a point behind the heel at a predetermined angle, a second slidable member movable along said guide member, a second rule adapted to contact the inner ball of the foot and mounted on said second slidable member and being movable along said guide member, said two slidable members being linked to each other to move the rules in accordance with a predetermined relation between the length of the foot and the perpendicular distance between the first rule and the contact point of the second rule at the foot, a cross bar secured to the second slidable member, a third rule adapted to contact the extreme point of the outer side of the foot, a sleeve slidable along said cross bar, said third rule being mounted on said sleeve, whereby said third rule is movable together with said second rule in the longitudinal direction of the foot but is also movable separately in the transverse direction to measure the width of the foot, a pointer connected to the third rule, and a scale cooperating with said pointer for indicating the length as well as the width of the foot.

7. A foot measuring instrument as defined in claim 6, in which the sleeve carrying the third rule is provided with locking means to secure all movable members in adjusted position.

References Cited in the file of this patent

UNITED STATES PATENTS

| Number | Name | Date |
| --- | --- | --- |
| 1,582,636 | Clarke | Apr. 27, 1926 |
| 1,792,892 | Cobb et al. | Feb. 17, 1931 |
| 2,181,930 | Wheeler | Dec. 5, 1939 |
| 2,391,889 | Fitzpatrick | Jan. 1, 1946 |
| 2,507,032 | Mantos | May 9, 1950 |
| 2,597,972 | Butler | May 27, 1952 |